United States Patent [19]

Gergek

[11] 4,331,050

[45] May 25, 1982

[54] CONTROL FOR PAPER CUTTING APPARATUS

[75] Inventor: Franc Gergek, Willowdale, Canada

[73] Assignee: Computerized Cutters Ltd., Markham, Canada

[21] Appl. No.: 25,583

[22] Filed: Mar. 30, 1979

[30] Foreign Application Priority Data

Oct. 3, 1978 [CA] Canada .................................. 312625
Oct. 31, 1978 [CA] Canada .................................. 315014

[51] Int. Cl.³ ............................................. B26D 5/34
[52] U.S. Cl. ...................................... 83/71; 83/468; 83/522
[58] Field of Search .................. 83/71, 467, 468, 324, 83/522

[56] References Cited

U.S. PATENT DOCUMENTS

| | | | |
|---|---|---|---|
| 3,600,993 | 8/1971 | Williams et al. | 83/71 |
| 3,662,636 | 5/1972 | Young | 83/71 |
| 3,691,887 | 9/1972 | Roch | 83/71 |
| 4,201,102 | 5/1980 | Rudszinat | 83/324 |

*Primary Examiner*—Donald R. Schran
*Attorney, Agent, or Firm*—Stevens, Davis, Miller & Mosher

[57] ABSTRACT

A control mechanism for a paper cutting machine having a table for supporting a pile of sheets to be cut, cutting apparatus for operating it, a backstop mounted for movement along the table so as to position and advance the pile, and drive apparatus for moving the backstop along the table in either direction. A controller is electrically connected to the machine including a digital computer mechanism equipped to accept input information relating to the position of the back gauge and information from a keyboard and to store and process this information and retrieve it, and to provide input to control the drive according to desired programs. A keyboard and display are connected to the computer mechanism to operate the controller and display its action.

12 Claims, 16 Drawing Figures

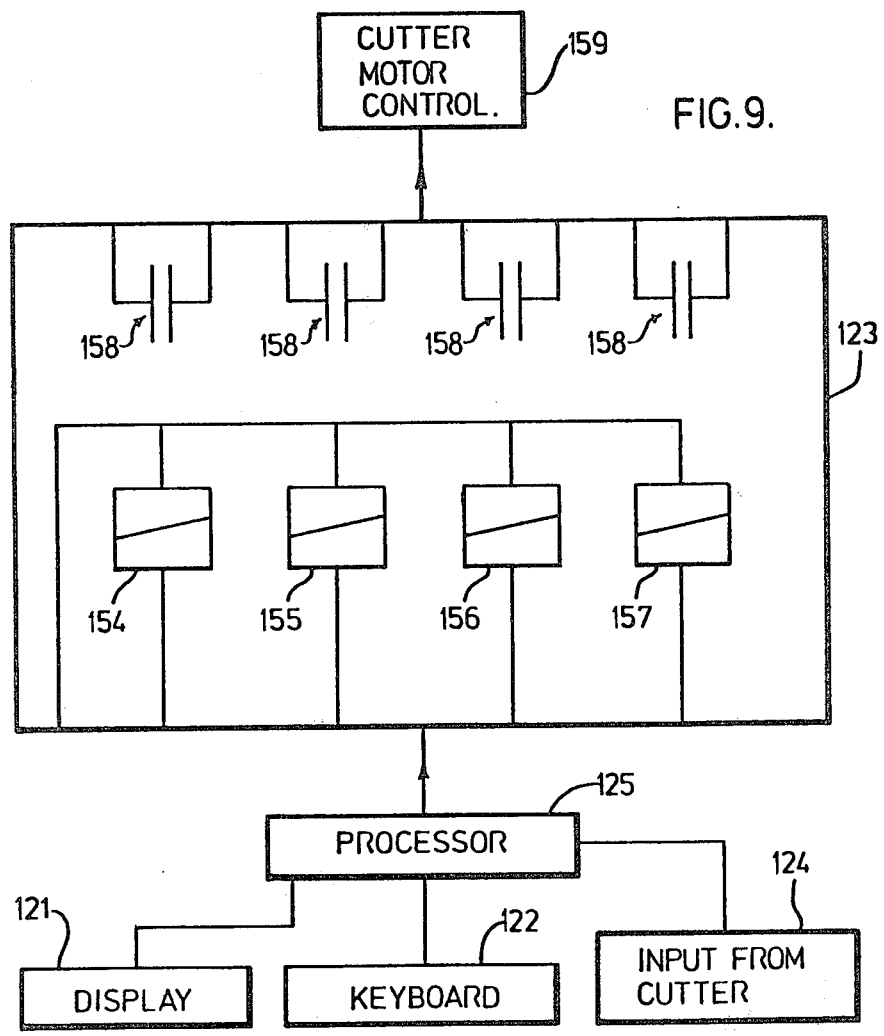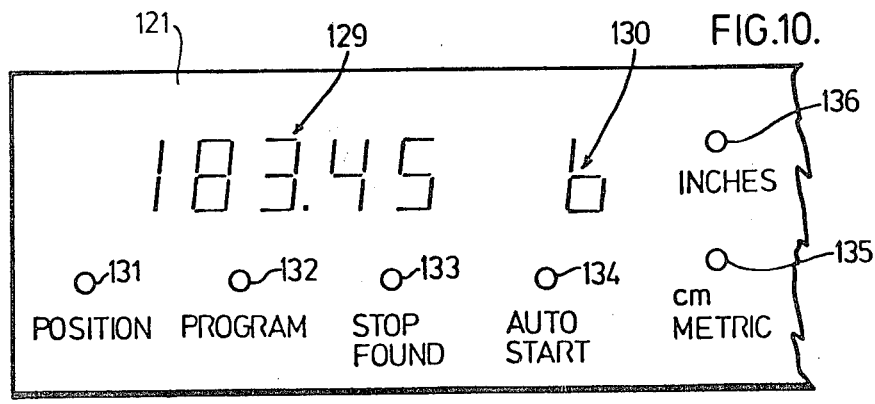

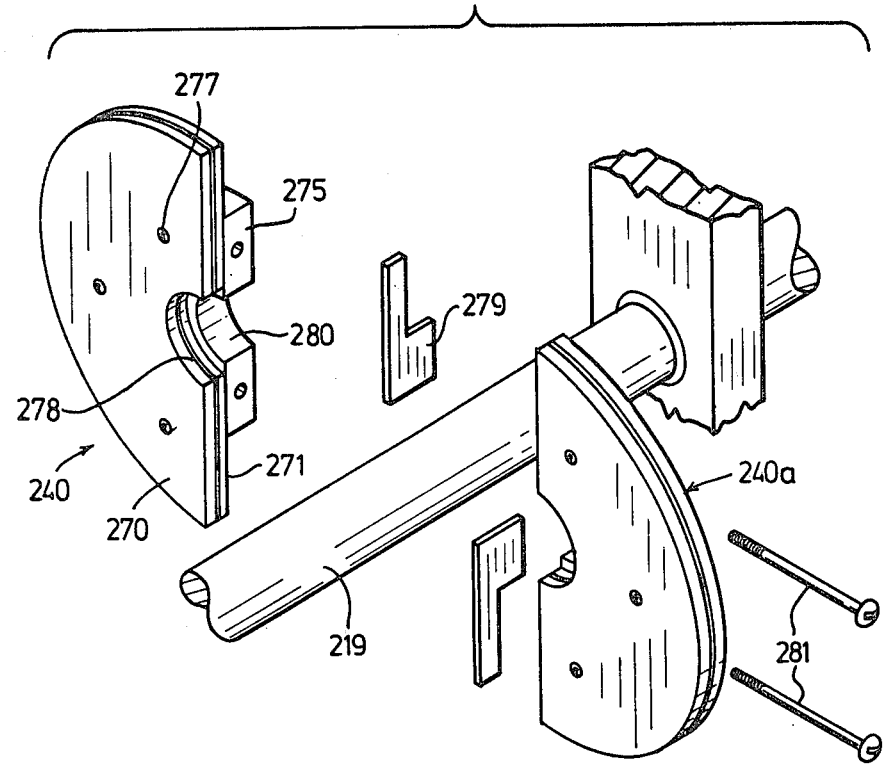
FIG.13.
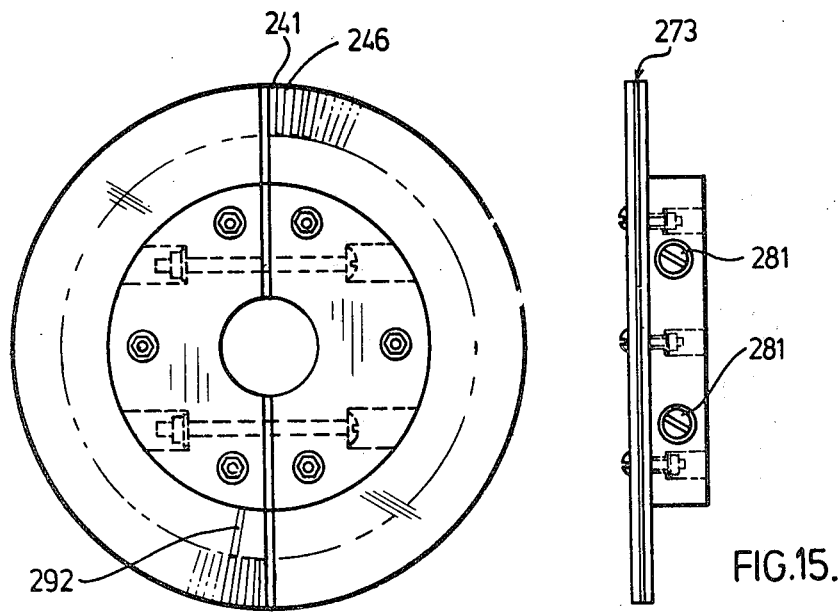
FIG.14.
FIG.15.

CONTROL FOR PAPER CUTTING APPARATUS

BACKGROUND OF THE INVENTION

1. Field of the Invention

This invention relates to a paper cutting apparatus.

More specifically, it relates to an apparatus which is provided with means for controlling a back gauge so that it automatically places a pile of sheets for cutting along a predetermined series of lines.

2. Description of the Prior Art

Normally, printed stock from sheet fed presses comes in the form of a pile of sheets which is to be cut in a predetermined manner to divide the sheets into pages, coupons, or other sub-divisions. The apparatus is made up of a table on which the paper stock is laid up in a pile to a few inches high. A back gauge is movable along the table by a worm gear which can be turned manually or automatically. Normally, automatic cutters have several separate push buttons or a joystick with concealed switches to provide fast forward, slow forward, reverse, sometimes slow reverse, and stop. Push buttons or switches are connected to a control box through relays and other circuitry which, in turn, governs the direction and speed of the motor driving the worm gear. There is a clamp which presses the paper stock tightly down during the cutting, and a guillotine which descends and cuts through the pile of stock.

In the normal cutting operation, the back gauge is either manually or automatically moved to the first cutting position. The paper stock pile is laid on the table and pushed firmly against the back gauge, the stock pile clamped in position, and the mechanism actuated to cause the guillotine to descend.

A position gauge on the apparatus displays the exact position of the back gauge. There are several different types in use. One is a series of optical discs, connected through gears to the worm gear. A window shows inches and another window fractions of an inch. These discs can be mounted in a convenient place and by mirrors or other optical devices their showing may be displayed in a window in front of the machine.

A controller, which may be electronic and magnetic, or electronic and mechanical, enables the operator to store information so that the machine will move the back gauge and stop at preprogrammed positions. There are a number of ways of doing this. One is with a bar running lengthwise of the table and having a magnetic tape on its surface. One or more magnetic heads connected to the back gauge slide along the magnetic tape. The magnetic tape is marked so that when the magnetic head passes the mark signals are transmitted through the electronic circuitry to control the movement of the back gauge.

The types of controllers mentioned present certain problems. For example, a magnetic tape and magnetic head tend to become dust covered. The magnetic elements also wear out and have to be replaced. Moreover, faint signals from the magnetic head may not be strong enough to pass through the contacts of relays and connectors. Mechanical controllers are limited in their application.

SUMMARY OF THE INVENTION

It is an aim of the invention to provide mechanism which avoids these problems and provides positive advantages including greater accuracy and faster operation and which may be used with paper cutting apparatus of different types. The invention provides a controller electrically connected to signalling means associated with the drive means for signalling the movements of the back stop. The apparatus is provided with a fixed position reference switch for indexing the position of the back gauge. The back gauge is provided with a reference marker which is sensed by the position reference switch. The controller includes computer mechanism for converting the signals into distances corresponding to the travel of the back stop. The computer mechanism includes means to control the drive means to stop and start the back stop and move it in either direction. A keyboard is connected to the controller for registering a plurality of programs each made up of a number of sequential positions of the back gauge with each program on separate channels, with means for selecting a desired channel and retrieving the program and applying it to the movement of the back gauge. Display means portrays the action of the controller. Preferably the controller includes means for setting it to work in metric measurements or in inches or fractions. Preferably the controller is provided with output relays between the processor and the drive control means including a fast forward relay, a slow forward relay, a reverse relay, and a stop relay.

Where the invention is applied to a paper cutting apparatus having a worm gear, preferred signalling means is made up as follows. A transparent disc is mounted on the worm gear for rotation with it. The disc is provided with a regular series of radial stripes of predetermined width and spacing. A pair of photosensors is spaced-apart a predetermined distance about the disc whereby there are produced, as the disc rotates in either direction, wave forms corresponding to the stripes. The controller is electrically connected to the photosensors and the computer mechanism converts the waveforms into distances corresponding to the travel of the back stop.

In a preferred construction, according to the invention, the signalling means is provided with a vernier arrangement. This includes an additional marking on the disc and a photosensor for sensing that marking. As movement of the back gauge is initiated, the controller moves it back until it is stopped by its own control. The controller presets, roughly, the position of the back gauge. After this rough setting, the controller moves the back gauge forward until the photosensor senses the vernier marking and this signifies to the controller the exact position of the back gauge.

BRIEF DESCRIPTION OF THE DRAWINGS

The invention, as outlined, will now be described more specifically by reference to the accompanying drawings, which illustrate preferred embodiments, and in which:

FIG. 9 is a more detailed view of the preferred form of control mechanism according to the invention;

FIG. 10 is a front elevation of the display of a control mechanism;

FIG. 13 is an exploded view showing a preferred form of disc, constructed for convenient attachment and detachment to a worm shaft which is also shown;

FIG. 14 is a front elevation of the disc of FIG. 13;

FIG. 15 is a side elevation of the disc of FIG. 13.

DESCRIPTION OF THE PREFERRED EMBODIMENTS

Referring more particularly to the drawings, the nature of a cutting apparatus according to the invention will be explained in terms of its basic operation as follows.

Figure 1:
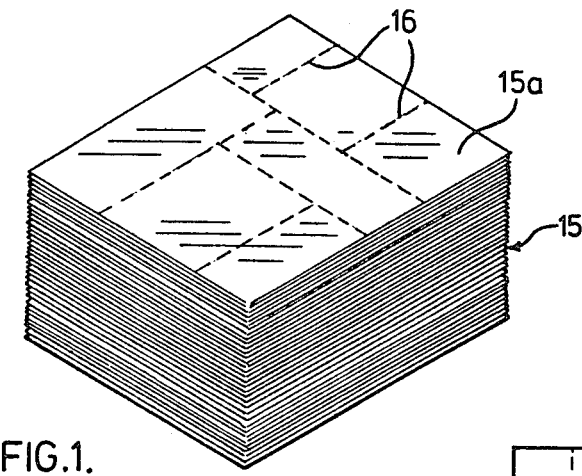
FIG. 1 is a perspective view of a pile of sheets ready to be cut.
Figure 2:
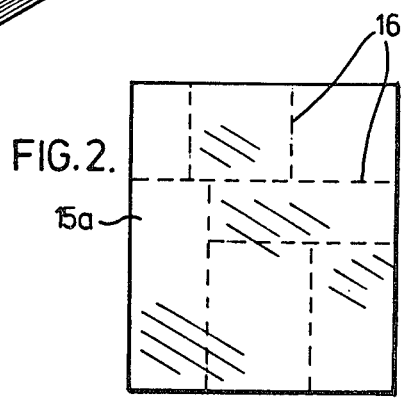
FIG. 2 is a plan view of the pile showing the top sheet.

The printed stock from sheet fed presses comes in the form of a pile of sheets 15 (FIG. 1). Each sheet 15a is marked as at 16 to show the cuts required to divide the sheets into pages, coupons, etc. (FIG. 2).

The apparatus includes a table 17 on which the paper stock is laid up in the pile 15 to a few inches high and a back gauge 18 movable alongside the table by a worm gear 19, and having an upstanding reference marker 18a.

Figure 4:
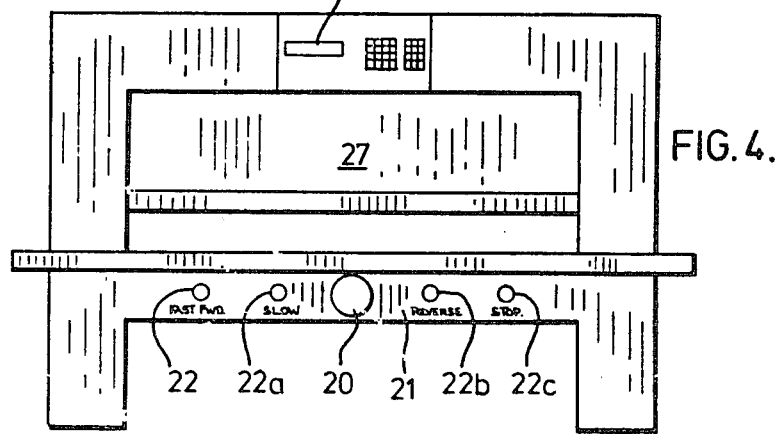
FIG. 4 is a front elevation of the apparatus of FIG. 3 showing the control panel.

The gear 19 can be turned manually by a standby wheel 20 or automatically, according to the invention, by a motor mechanism controlled by push buttons in a panel 21 (FIG. 4). Normally, cutters have up to five separate push buttons 22, 22a, 22b, etc. (or a joystick with concealed switches) to provide fast forward, slow forward, reverse, sometimes slow reverse and stop.

Figure 3:
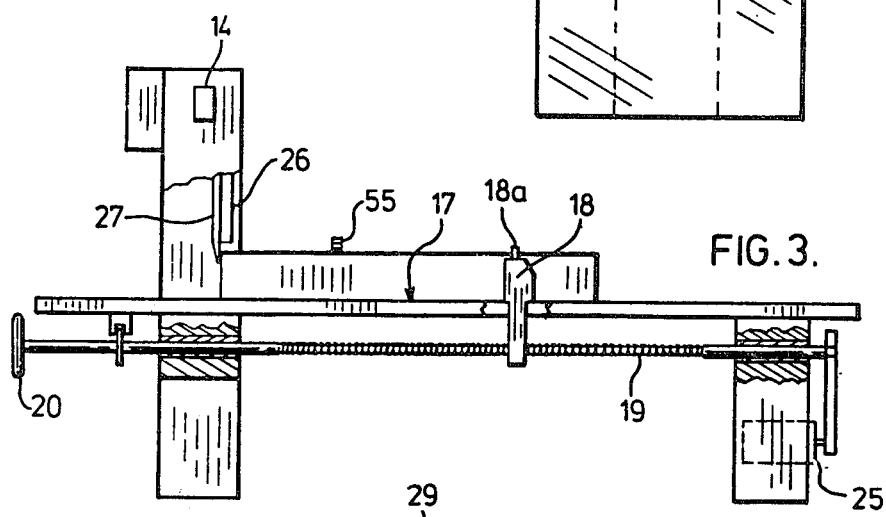
FIG. 3 is a front elevation of a cutting apparatus equipped according to the invention.

The push buttons or switches are connected to a control box (not shown) through relays and other circuitry which may be of a conventional nature which, in turn, governs the direction and speed of the motor 25 (FIG. 3).

Above the table 17 there is a clamp 26 (FIG. 3) which presses the paper stock tightly down during the cutting and guillotine 27 (FIG. 3) which comes down and cuts the stock.

The cutting procedure is as follows. The back gauge 18 is moved to the first cutting position. The paper stock pile 15 is laid on the table and pushed firmly against the back gauge 18. Through a foot pedal or other means, the driving mechanism is activated and the clamp 26 squeezes the paper stock down. The display 29 (FIG. 4) displays the position of the back gauge 18.

Figure 5:
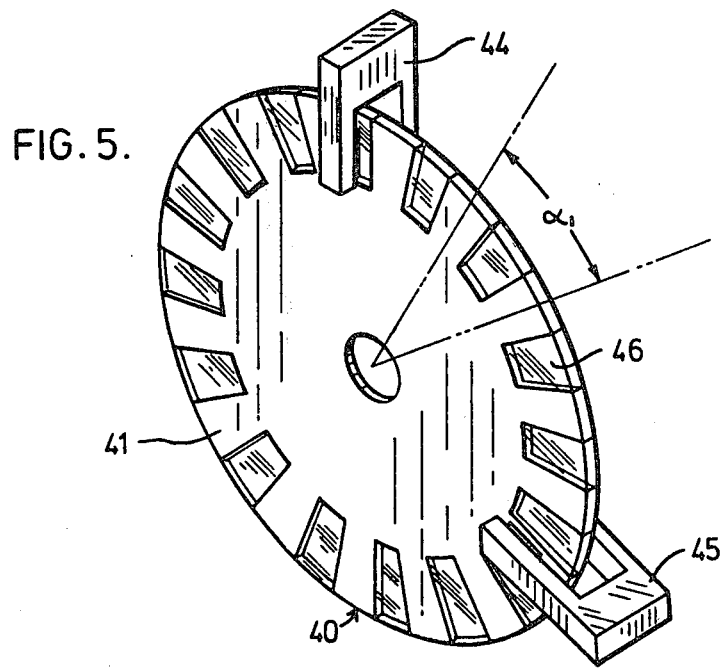
FIG. 5 is a perspective view of the control disc and pair of coooperating photosensors.

An optical (transparent) disc 40 is fixedly mounted on the worm gear underneath the table. On the disc 40 are opaque areas 41 (FIG. 5) which are scanned by two photosensors 44 and 45, mounted to the side of the disc.

Figure 7A:
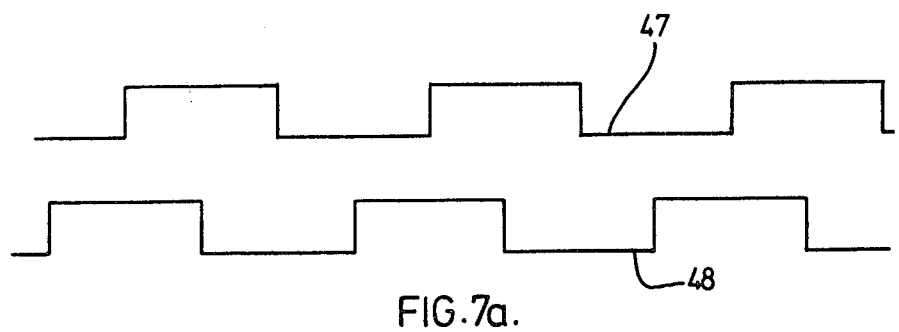
FIGS. 7a and 7b illustrate control wave patterns created by the rotation of the disc relative to the photosensors.
Figure 7B:
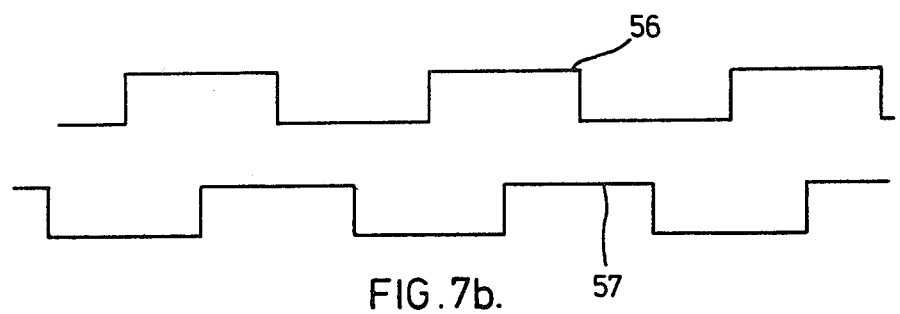

When the disc 40 (and the worm gear 19) turn in one direction (e.g. clockwise) the photosensors 44 and 45 give respective waveforms 47 and 48, as shown in FIG. 7a. When the disc 40 turns in the opposite direction (e.g. counterclockwise) the photosensors 44 and 45 give different waveforms 56 and 57 (FIG. 7b).

When the disc 40 turns through an angle $\alpha 1$ (an angle between the two adjacent lines), the back gauge 18 moves longitudinally for a distance D. The distance D may or may not be directly part of an inch (e.g. 0.01 of an inch) or part of a centimeter, since a control with numerical conversion into inches and centimeters is used.

Figure 6:
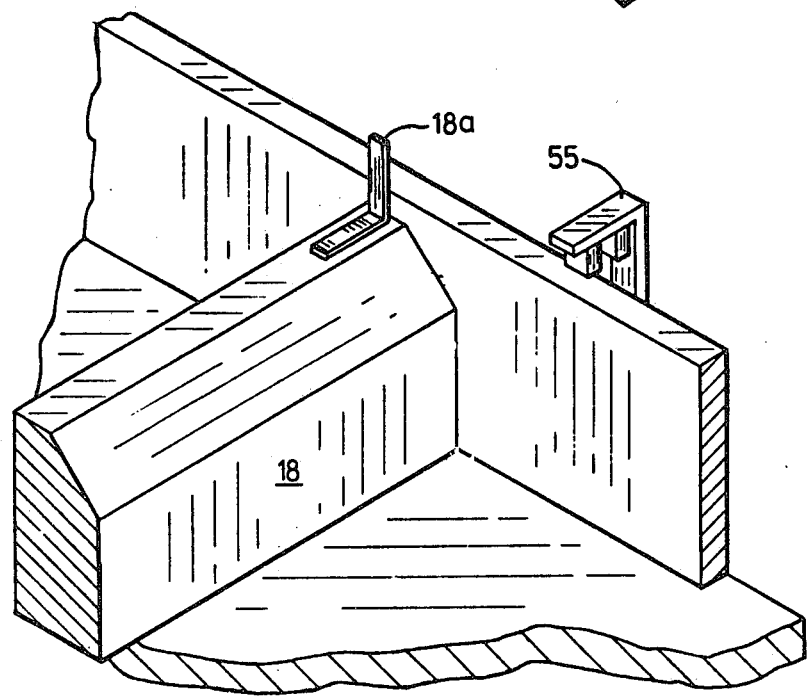
FIG. 6 is a perspective view illustrating the relationship between the back gauge and the position reference switch.

When the controller is first activated there will be a procedure-initiation movement during which the back gauge hunts for the position reference switch 55 (mechanical, or photo, or magnetic) (FIG. 6). The position of the reference switch 55 is fixed and whenever the back gauge 18 passes it, moving in one direction (e.g. forward), its position registers within the controller (numerical value in the memory or register). When the back gauge 18 passes the switch, moving in the opposite direction (e.g. reverse) the switch does not register.

Although the position reference switch 55 can be mounted anywhere the back gauge 18 can reach it, there is an advantage in having it towards the middle of the working distance. This is because the controller is always reset when the back gauge 18 crosses it moving in one direction.

A main difference in operation between the old magnetic and mechanical controllers and the digital one of the invention is that the old types of controllers do not sense the position of the next cut. They can only pick up marks for cuts while the back gauge is moving.

The new controller, on the other hand, senses the position of all cuts and also the position of the back gauge. It can, therefore, at any time, decide in which direction the back gauge has to move.

The normal running procedure when cutting printed stock on a cutter with an old controller would be as follows. The operator selects a programmed channel and by pressing the start push button sends the back gauge back to the preset limit and then the back gauge moves forward. When the magnetic head or mechanical cam senses the mark, the back gauge stops.

The stock is laid on the table and pushed against the back gauge. The operator activates the cutting mechanism and when the cut is made, the back gauge starts moving forward. When the next mark is sensed, the back gauge stops again. The second cut is made and so on. When all cuts along one side of the stock are made, the back gauge moves back to the preset limit, switches to the second mechanical or magnetic channel, starts moving forward, and when the first mark is sensed, the back gauge stops again. The stock which has already been cut in one direction is turned 90° and pushed against the back gauge. Now the cuts are performed in the other direction.

The controller, according to the invention, senses the position of all marks (cuts) 16 at all times. It can therefore decide, at any time, in which direction and with what speed the back gauge has to move.

The cutting procedure is also different from that of prior devices. First the back gauge 18 hunts for the position reference switch 55. After finding it, the back gauge 18 moves to the first mark and stops. The cut is made and the back gauge 18 moves to the second mark and so on.

Because all the marks are stored in the same sequence (also called channels), the term side is introduced to give the operator a way of knowing where is in the cutting operation, i.e. in which direction on the pile he is cutting, digits are introduced in the display to show the side. The side is always set at 1, when the first stop (mark, cut) in the channel (or sequence is found. When the controller and the back gauge are searching for the mark, the side does not change if the next mark is smaller (closer to the front) than the current one. If, however, the next mark is larger than the current one the side digit is increased. So then the operator knows he has to turn the pile 90° to make the cuts in the transverse direction.

Unlike the old controller, where the back gauge moves in reverse to the preset limit when switching to a new channel, in the applicant's controller, the back gauge 18 moves in reverse only about one-half inch past the mark when starting a new direction. This saves time.

In the old controllers there is a limit to how close two stops can be because (a) a magnetic or mechanical mark has a certain width, and (b) inertia requires a minimum stopping distance. Before stopping, the back gauge 18 is moving at a certain speed. After a stop is signalled by the controller (power to the driving motor is turned off and the brake is applied), the back gauge 18 still moves for a certain distance before coming to a complete stop. In the old arrangement, the next mark cannot be closer to the preceding one than the stopping distance. This problem is overcome, according to the invention, when two marks are very close together by first reversing the direction of the back gauge before it moves forward. In this way, the operation is not limited to any minimum distance between stops.

The stopping distance is taken into account, in most controllers, so that the mark is sensed a certain distance before the actual cut is made. The stopping distance is dependent, however, on many factors and is different from one machine to another.

To avoid individual setting of each cutter to correct the error arising through the stopping distance problem and to achieve maximum accuracy the present invention introduces auto-correction.

During each stopping procedure, the controller measures the distance, from the moment a stop is signalled to the moment when the back gauge 18 comes to a complete halt. Or, the controller measures the time delay from the moment the stop is signalled to the moment the back gauge 18 comes to a complete halt. Or, the controller uses a combination of both distance and time.

The problem is that measuring the stopping distance alone is not accurate enough. If, for example, the stopping distance is 0.0244", because the controller operates with a minimum distance of 0.01", it cannot express the stopping distance accurately. To overcome this problem, the applicant's apparatus expresses the stopping distance as $0.02'' + \Delta t$ (delay) which is a combination of distance and time delay.

As stated, either the stopping distance or time delay or a combination of both is measured during each stop. At the resulting stop, the controller pre-signals the stopping of the back gauge 18 at the correct distance (and-/or time delay) before the desired position.

An average stopping distance (and/or time) can also be calculated over more stops and use it rather than individual values.

Without going into details of wiring of many different types of cutters, the new controller can move the back gauge with four relays: FAST FORWARD, SLOW FORWARD, REVERSE and STOP. They can be connected directly to switches in the front of the cutter (FIG. 4) to perform the same function as the switches.

Figure 8:
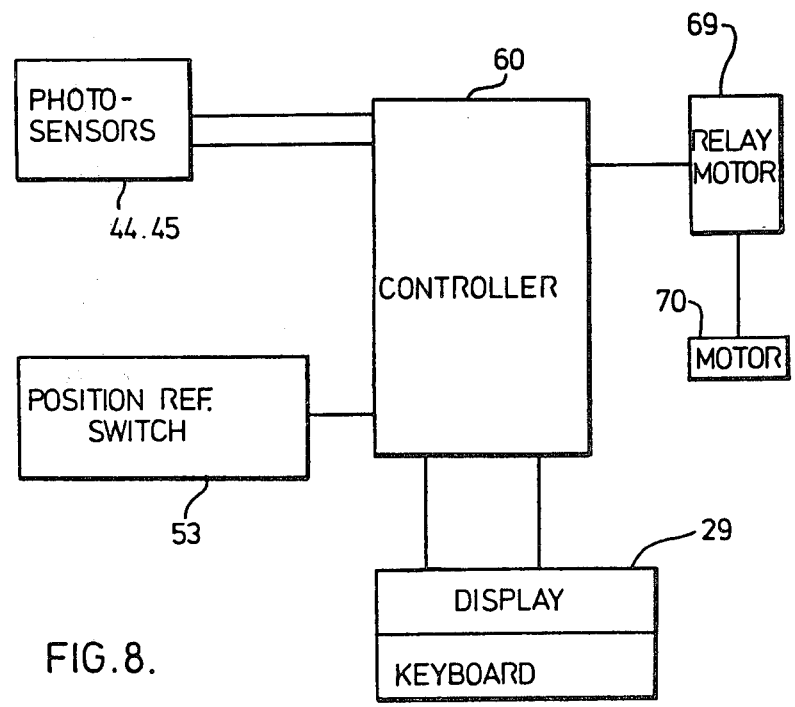
FIG. 8 is a block diagram showing relationship between the controller, the control disc, the position reference switch, the operating motor and the display and keyboard.

FIG. 8 is a block diagram showing the relationship between the mechanical parts of the apparatus and the control mechanism. 60 represents a controller which contains a computer capable of receiving, storing and transmitting information. The disc 40 is connected through the photosensors 44 and 45 to the controller 60 so that a wave pattern is transmitted from the disc through the photosensors 44 and 45 and is picked up and analyzed by the controller 60.

The position reference switch 55 is connected to the controller 60 so that the starting position of the back gauge 18 is recorded in the controller 60 to index its subsequent movements.

The display and keyboard 29 is connected to the controller 60 so that the operator can see the position of the back gauge 18, and all stops in the program and which direction (side) the cutting is taking place and which channel is being used. The controller is, in turn, connected to the motor 70 control which provides mechanism to stop and start the motor to move it forward slowly or fast and to reverse slow and fast.

The connection of the keyboard 29 with the controller 60 enables the operator to use the keyboard 29 to manipulate the program according to the following sequence.

1. When the power is turned on, the back gauge 18 moves automatically until it finds the position reference switch 55. The moment the position reference switch 55 senses the back gauge 18 the display 29 comes on. The controller is now ready for use.

2. If the controller 60 has not been cleared, first the operator has to clear the memory.

3. Then the operator will select a channel in which he wants to store the program for the cutting job he wishes to perform. The operator may prepare the program as follows. He may bring the back gauge 18 to the cutting positions and press the store key each time. Or he may measure the stock with a measuring instrument, for example, a tape measure and enter the cutting position through manipulating the keyboard 29. The back gauge is then under the automatic control of the controller 60. After each cut the back gauge 18 will move automatically since the start switch is also connected to the guillotine 27. Alternatively, the back gauge 18 may be moved from position to position using the start button.

The computer used in the controller can be any computer having sufficient speed, and storage capacity to register and analyze the waveforms described, and to provide an output to the motor.

The invention also contemplates a preferred controller which serves:

(a) to display the position of the back gauge, and (b) to enable the operator to store a program or cutting sequence which, in turn, automatically controls the movement and the positioning of the back gauge.

A controller, according to the invention, is illustrated diagrammatically in FIG. 9. It includes a display 121 and a keyboard 122, which will later be described in more detail, each connected to a processor 125. The processor 125 is, in turn, connected to output relay in the box 123 and to the input 124 from the cutter.

The processor may be any digital computer adapted to accept input information relating to the position of the back gauge and information from the keyboard and to store and process this information and retrieve and display it to show the position of the back gauge, the program sequence, the side and channel and to provide output to operate the back gauge as will be more fully explained. One suitable processor is the "Intel 8085 Micro Processor System".

The display 121, as shown in FIG. 10, has the the following features. It is provided with fixed lights 131, 132, 133, 134, 135 and 136. The display is also constructed to show a five digit first series of numbers 129 and separated therefrom a second series of numbers 130.

Figure 11:
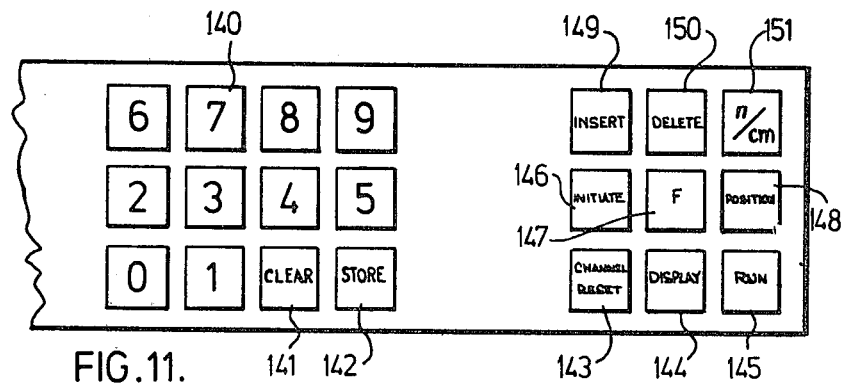
FIG. 11 is a plan view of a keyboard of the mechanism.

The five digit series 129 indicates the following:

(a) when the position light 131 is on, the series 129 shows the position of the back gauge. This position is displayed in either metric form (centimeters and hundredths of a centimeter) when the cm-metric light 135 is on, or in fractional form (inches and hundredths of an inch) when the inches light 136 is on;

(b) when the program light 132 is on, the series may either indicate the content of the program sequence or a value entered through the keyboard 140 (FIG. 11).

The second series 130 may constitute a channel side number indicating the following:

(a) when the position light 131 is on, the number 130 shows the side being cut;

(b) when the program light 132 is on, the channel side number 130 shows the channel number. The "stop found" light 133 comes on after the controller has moved the back gauge to the selected position. The light 133 goes out when any key of the keyboard 122 is pressed or when the blade 6 descends. The "autostart" light 134 shows whether or not the controller will start moving the back gauge automatically after the cut.

The keyboard (FIG. 11) is made up as follows. It has data keys from 0 to 9 , a "clear" key 141 which appears only to clear the display, a "store" key 142 is actuated to store the value of the display into the memory. Other keys are a "channel reset" key 143 used for a channel selection, a "display" key 144 used to display the contents of the memory, a "run" key 145 to start the searching of the back gauge 18, an "initiate" key 146 to reset the computer to start hunting the position reference switch. An "F" key 147 has a function depending on the value of the display when the key is pressed. A "position" key 148 displays the position of the back gauge. An "insert" key 149 inserts one more stop into the existing program. "Delete" key 150 is to remove one stop only from the existing program. An "inches/centimeters" key 151 is provided to set the controller to work in metric form or in inches and fractions.

For fulfilling its function of displaying the position of the back gauge 18 and controlling its movements, the controller is provided with four output relays 123 (see FIG. 9). These include a fast forward relay 154, a slow forward relay 155, a reverse relay 156, and a stop relay 157. The relay contacts 158 are conveniently connected to the control of the motor 159.

Not all cutters are equipped to operate at several speeds. For example, the cutter may only operate at a single speed in forward and reverse. In this case, only fast forward relay and the reverse relay 156 are employed.

The input from the cutter to the controller is effected as follows.

When the controller is first activated, there will be a procedure-initiation movement during which the back gauge hunts for the position reference switch 172, which is in fixed position. Whenever the back gauge 18 passes the position reference switch 172 moving in one direction (e.g. forward) the position registers within the controller (numerical value in the memory or register). When the back gauge 18 passes the switch moving in the opposite direction (e.g. reverse) the switch does not register.

The switch 14 (FIG. 3) signals to the controller when the guillotine descends. The switch 14 has the following purpose:

(a) while the controller is in the programming mode, the switch 14 signals to the controller that a cut has been made. The controller stores that position in the program so that later it will move the back gauge to the same position;

(b) while running the cutter according to a program, the switch 14 signals to the controller that a cut is made. The controller finds the next stop in the program and puts the controller into search mode.

The control of the cutter motor inhibits movement of the back gauge until the guillotine returns to its "up" position.

Operation

The operation of the preferred control mechanism will now be described in more detail.

When power is applied to the apparatus this will go into initiating, during which the back gauge will move forward and reverse until the position reference photoswitch is crossed. After the back gauge stops, the controller is ready to be used.

Whenever malfunction of the controller is observed the initiate key must be pressed. The apparatus goes into the same initiation as during "power on".

The controller is normally powered by rechargeable batteries to retain the program even though the power to the controller is cut off. However, if the batteries are discharged or if for any reason the memory has lost its programs, it must be cleared before any program can be stored in it. To clear the memory the keys that must be pressed are clear and 98.76 into display and F.

If, while displaying the program, it is noted that some digits are missing, this is an indication that the programs are partially or completely lost and the memory may have to be cleared.

The controller, shown by way of example, has ten channels from 0 to 9 (the number of channels may be increased at will) but, unlike prior art controllers, only one job is stored on a channel. The channel number is displayed only during programming. To select a new channel the following keys must be pressed, channel reset, and any key from 0 to 9. The channel clears on the right hand side of the display.

Only one channel should be clear, the channel is selected by pressing clear and store.

The position of a cut can be measured and entered into the display through the keyboard either in decimal or fractional form.

There are two different ways in which the controller can be programmed:

(a) Using the keyboard select channel
clear channel
set mode (decimal or fractional) if necessary Measure and enter the first position into display STORE Measure and enter the second position into display STORE etc.

If at certain cuts the back gauge is not wanted to move automatically after the cut, store that mark twice.

Example 4.00
24.13
16.15
2.19
2.19

At 2.19 the back gauge will not move automatically to 4.00. It will move after pressing RUN key.

(b) Directly from the stock select channel
clear channel
4F

Move the back gauge to jogging position and press STORE. Load the stock and make all the cuts. If at certain cuts you do not want the back gauge to move automatically after the cut, when you come to that cut during programming press STORE before cutting.

To run machine by a program, press
RESET CHNL
RUN

The program may be displayed as follows:
The content of the channel can be examined by pressing
RESET CHNL
Enter new channel if necessary
DISPLAY By pressing the DISPLAY key the entire program can be examined (scanned). At the end of the channel number 0.00 appears.

Further pressing of the DISPLAY key shows the content of the next higher channel.

The cutter may be run by a program as follows:
After all program has been entered press
RESET CHNL
Change channel if necessary
RUN The back gauge moves forward until it reaches the position reference switch then moves forward to the first stop in the program. After a cut is made the machine moves automatically to the second stop, if the AUTO START light is on.

One job is always stored on one channel only. During running the cutter by a program, the fifth digit displays the side being cut (not the channel).

Any combination of stops can be put in the program. The side is set to 1 at the beginning of the channel, and is incremented whenever the back gauge moves reverse.

Example

| Positions | Side |
|---|---|
| 10.00 | 1 |
| 32.16 | 2 |
| 20.20 | 2 |
| 8.09 | 2 |
| 28.80 | 3 |
| 14.30 | 3 |
| 11.71 | 3 |
| 30.30 | 4 |
| 22.28 | 4 |

-continued

| Positions | Side |
|---|---|
| 15.15 | 4 |

At the end of the program the back gauge first moves forward until it finds the position reference switch, then to the first stop. Side is also set to 1.

After pressing CHNL RESET, RUN the back gauge moves to the first position.

To start somewhere in the middle of the channel press CHNL RESET. Keep pressing DISPLAY key until the stop where you want to start appears.

Press RUN.

Single stop operation may be accomplished as follows:
Enter the cutting position into display (in decimal or fractional form). Press RUN The back gauge moves to desired position. When manually adjusting the back gauge approach always from behind.

The program may be changed as follows:
(a) To reposition one stop in the program, for example change 26.92 to 26.90

Use DISPLAY key to scan the program until the stop which has to be repositioned appears.

Enter the correct position into display. Press STORE key.

(b) Repositioning the stop during running by a program.
After the back gauge comes to the stop which has to be repositioned (26.92 in example), move the back gauge manually to the correct position, press STORE.

While scanning through the program, using DISPLAY key a stop is arrived at which should not be in at all, press DELETE to remove it.

If during running the cutter by a program a stop is arrived at which should not be there press DELETE key to remove it from the program.

If a stop has been omitted while programming

Example 28.16/missed 26.92
24.17 use DISPLAY key to come to the stop before missed one (28.16 in example). Enter the missed stop into display. Press INSERT key.

Stop can be inserted also while running the machine by a program. After the back gauge stopped at the last stop before the missed one, move manually the back gauge to inserted position. Press INSERT key. To change stops along one side (only while running the cutter by a program) after the back gauge stops at the position where the change should start, move the back gauge to the correct position and press F key all stops along that side which follow the current stop (including) were changed for the same amount.

| Before Position | 1 | | After Position | Side |
|---|---|---|---|---|
| 4.00 | 2 | | 4.00 | 1 |
| 28.00 | 2 | | 28.00 | 2 |
| 18.00 | 2 | ← At this stop | 17.94 | 2 |
| 16.00 | 2 | move the | 15.94 | 2 |
| 12.00 | 2 | back gauge | 11.94 | 2 |
| 10.00 | 2 | to 17.94 and | 9.94 | 2 |
| 10.00 | 2 | press F key | 9.94 | 2 |
| 8.00 | 3 | | 7.94 | 2 |
| 22.00 | 3 | | 22.00 | 3 |

| Before Position 1 | After Position | Side |
|---|---|---|
| 15.00 | 15.00 | 3 |

Figure 12:
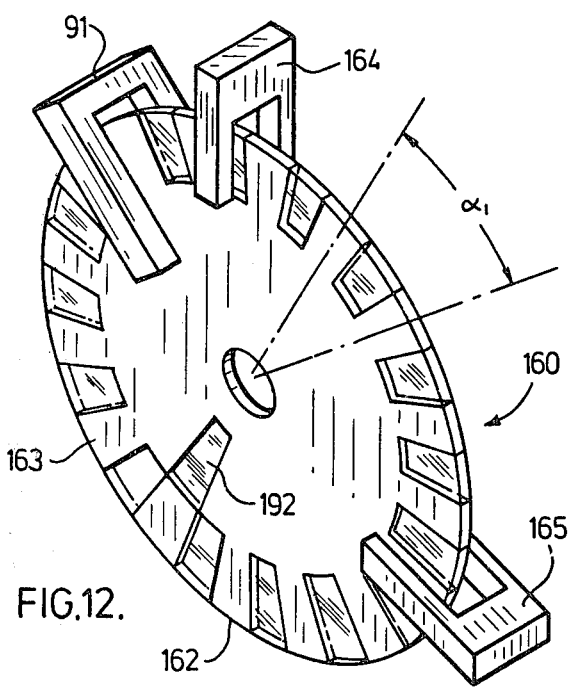
FIG. 12 is a perspective view of an alternative form of signalling disc, according to the invention, and related photosensors.

FIG. 12 illustrates an alternative form of signalling device by which a more accurate position reference may be obtained. The disc in this case is opaque and is provided with alternating opaque sections 163 and transparent sections 160 abouts its periphery. Photosensors 164 and 165 cooperate with the disc as in the structure of FIG. 5. An additional transparent section 192 is provided on the disc which is sensed by an additional photosensor 191.

When the disc 162 is used in the combination of the invention, the position switch 272 and the marker 18a on the back gauge can remain, although they need not be used. It is useful to retain the marker 18a and the position reference switch 55 for use, for example, in an apparatus where the back gauge cannot be moved back to a back stop, or where the extreme reverse position of the back gauge can vary making unreliable this manner of indexing the position of the back gauge. However, instead of sensing the edge of the marker 18a the switch 272 gives only the rough position, whereas the fine position is picked up by the photosensor 192.

During the initiation or hunting, the controller retracts the back gauge 18 until it is stopped by its own control. The controller presets, roughly, the position of the back gauge. After this rough setting, the controller moves the back gauge forward for a fixed distance when the photosensor 191 senses the segment 192 and this communicates to the controller the exact position of the back gauge.

To improve the reliability of the operation, the controller also has a built in self-testing feature. When, during hunting, the photosensor 191 senses the mark 192, an internal control counter or register in the controller is preset to a fixed value. Then the disc rotates in one direction or the other. The photosensors 164 and 165 register the movement of the disc and decrease or increase the value of the control counter. When a certain value is registered, the photosensor 191 must sense the segment 192. If it does not, the controller stops the back gauge and signals an error. Such error might arise, for example, through dirt accumulating on the disc and obscuring the transparent openings so that they are not sensed by the photocell. In that event, the operator presses a certain key on the keyboard and the back gauge starts hunting for its position reference and, after it finds it, continues with the operation which was stopped due to the error.

Preferably the transparent disc is embodied in a construction in which there are two halves which fit over and are clamped to the worm gear shaft so as to form a composite disc. In a preferred construction, also, the disc itself is made up of a pair of transparent sheets between which there is sandwiched a film on which the opaque and transparent areas are reproduced photographically.

A preferred form of disc, constructed for ready attachment and detachment to the worm shaft is shown in FIGS. 13 through 15. To the extent possible, similar reference numerals have been applied, with the exception that they have been raised into the 200's. In this case, the disc 240 is made in two complementary parts which fit together to engage the shaft 219. Each half disc is made up of a pair of transparent semi-circular plates 270 and 271 which sandwich between them a film 273 on which the transparent areas 246 and the opaque areas 241 and the transparent vernier area 292 have been photographically applied. The halves are brought together to surround a hub 275 and secured by screws 277. The disc has a central opening 278 which registers with a central opening 280 in the hub 275.

In attaching the disc to the shaft 219 the half discs 240 and 248 are brought together with resilient shims 279 between them and the two halves are bolted together with bolts 281 so that the disc as a whole firmly engages the shaft. Preferably when the disc is cut to provide the halves the cut is made through the opaque areas. Then, the shims 279 screen the slot resulting from the cutting.

This arrangement is most convenient and economical since it can be applied without dismantling the apparatus. Moreover, the sandwich construction of the disc is most advantageous since the optical film 273 can be produced photographically or in any other suitable way and is easily sandwiched between the respective transparent plates 270 and 271. The plates 270 and 271 and the film may be of suitable plastic material generally selected for this kind of use. The hub may be of wood or composite resin impregnated laminated fiber of textile material or any other rigid material capable of being machined or otherwise worked to the shape desired.

I claim:

1. A control mechanism for use in conjunction with a paper cutting machine having a table for supporting a pile of sheets to be cut, cutting means for cutting said pile of sheets and means for operating the cutting means, a back gauge mounted for movement along the table so as to determine cutting positions of the pile and to stop it in a position for cutting, mechanical drive means including a worm gear operable manually or by power drive for moving the back gauge along the table in either direction, comprising, signalling means for signalling the movements of the back gauge including an optical disc mounted on said worm gear, a controller responsive to said signalling means and including a digital computer and means for resetting the controller when the back gauge moves to a key position, a keyboard connected to the computer, the optical disc having a series of circumferentially spaced-apart radial indicia, a pair of companion photosensors mounted in a position to sense the radial indicia on the optical disc, whereby its movement in one direction produces in the controller one wave form and its movement in the other direction produces another wave form, the controller being electrically connected to the signalling means and the computer converting the wave forms into direction and distance corresponding to the travel of the back gauge and provided with means to (a) accept and store such information and (b) to accept program information from the keyboard and to store and process this information and retrieve it on command from the keyboard or the cutting means and to provide output to control said mechanical drive means, and including, means connected to the computer mechanism to control the drive means to move the back gauge in either direction and stop the gauge in response to command from the computer mechanism, the keyboard operating the controller to register and store a plurality of programs on separate channels, each program made up of a number of sequential positions of the back gauge, means within the computer responsive to the keyboard or the cutting means for selecting a desired channel and retrieving a program and applying it to control the drive means to cause movement of the back gauge and a procedure for stopping it according to that program, digital display means connected to the computer mechanism for visually displaying the action of the controller, including the position of the back gauge and the cutting sequency programs.

2. A control mechanism, as defined in claim 1, in which the means within the computer mechanism to set the controller to work is in metric form or in inches and fractions.

3. A control mechanism, as defined in claim 1, in which the controller is provided with output relays between computer mechanism and the drive means including a fast forward relay, a slow forward relay, a reverse relay and a stop relay.

4. A control mechanism, as defined in claim 1, in which the keyboard has data keys from 0 to 9, a key for clearing the display, a storage key actuated to store a given value to the memory, a key for displaying the contents of the memory, a key for starting searching of the back gauge, an initiating key for resetting the computer mechanism to start hunting the position reference switch, a function key depending on the value of the display when the key is pressed, a position key for displaying the position of the back gauge, an insert key for inserting one more stop into the existing program, a delete key for removing one stop only from the existing program.

5. A control mechanism, as defined in claim 4, in which the keyboard includes a key to set the control to work in metric form or in inches or fractions and mechanisms within the computer mechanism for translating the movement of the keys.

6. A control mechanism, as defined in claim 1 or 4, which includes a display provided with a series of signal lights indicating position, program, stop found, and autostart respectively, two series of digits, a first series indicating, when the position light is on, the position of the back gauge, and when the program light is on, the content of the program sequence or a value entered through the keyboard, when the position light is on the second series constitutes a side number showing the side being cut, when the program light is on the second series showing the channel number, the stop found light coming on after the controller has moved the back gauge to the selected position and going off when a key of the keyboard is pressed or when the blade descends, the auto-start light showing whether or not the controller will start moving the back gauge automatically after the cut.

7. A control mechanism, as defined in claim 1, in which during each stopping procedure, the controller measures the distance from the moment a stop is signalled to the moment the back gauge comes to a complete halt.

8. A control mechanism, as defined in claim 1, in which the controller measures the time delay from the moment the stop is signalled to the moment the back gauge comes to a complete halt.

9. A control mechanism, as defined in claim 1, in which the controller from the moment a stop is signalled, makes a measurement combining distance and time from the moment a stop is signalled to the moment the back gauge comes to a complete halt.

10. A control mechanism, as defined in claim 1, in which the display shows the side along which the cut is being made.

11. A controlled mechanism, as defined in claim 1, in which the optical disc includes an index apart from the radial indicia and there is a photosensor for sensing said index, the controller including means for commanding the movement of the back gauge in reverse direction until the said photosensor senses the index thereby presetting the position of the back gauge and the controller.

12. A control mechanism, as defined in claim 1, in which said optical disc also has an index separate from said spaced-apart radial indicia and a photocell for sensing said separate index, on each rotation of the disc, to provide the controller with a single impulse on each rotation of the disc which sets the exact position of the back gauge.

* * * * *